Nov. 19, 1935.  W. WUERFEL  2,021,572
METHOD OF MAKING PISTON RINGS
Original Filed Feb. 3, 1930  2 Sheets-Sheet 1
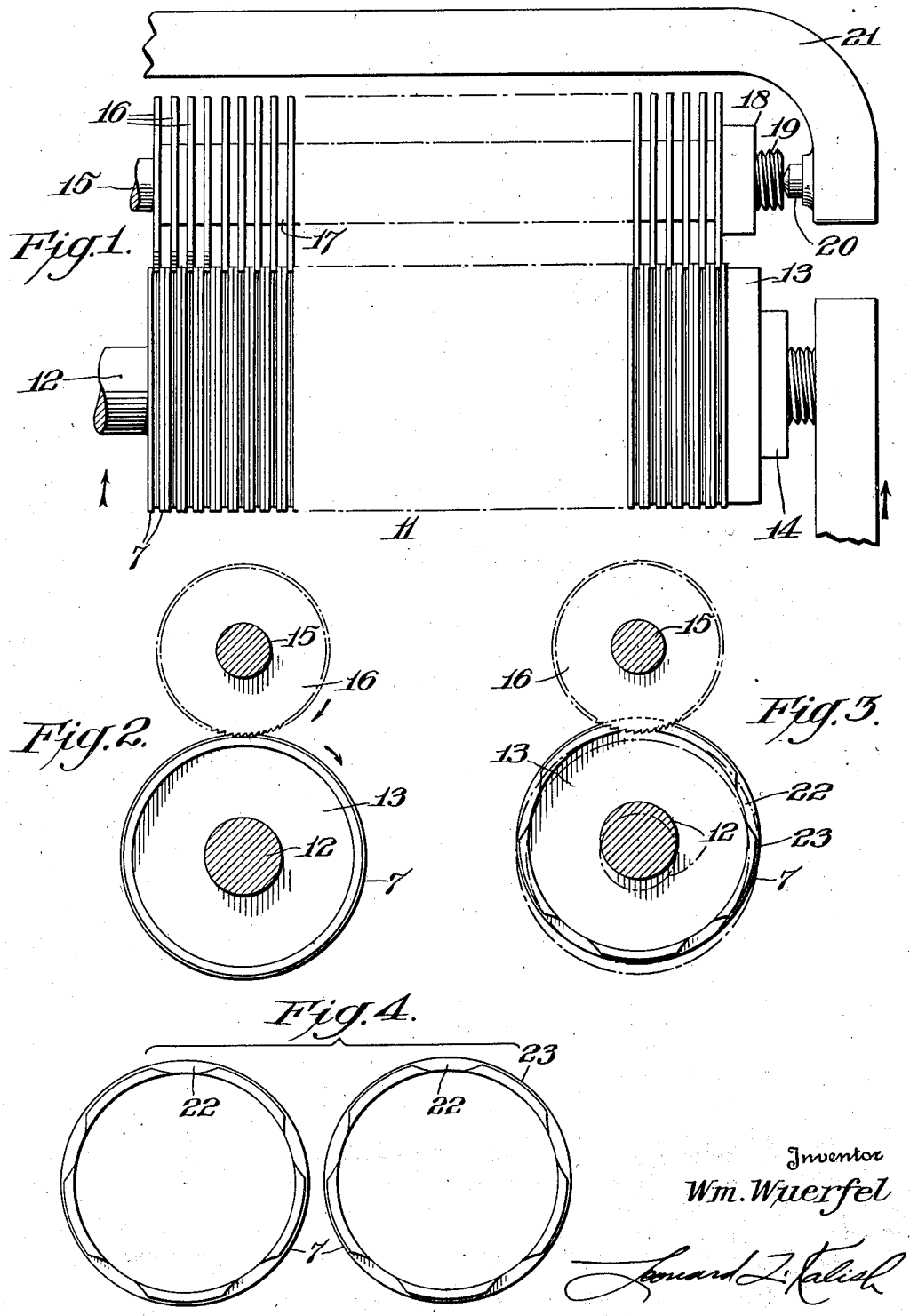
Inventor
Wm. Wuerfel
Leonard L. Kalish
Attorney Nov. 19, 1935. W. WUERFEL 2,021,572
METHOD OF MAKING PISTON RINGS
Original Filed Feb. 3, 1930  2 Sheets-Sheet 2
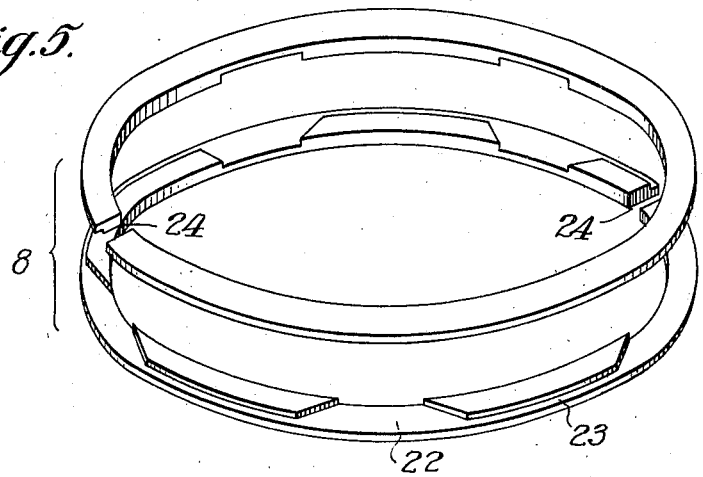
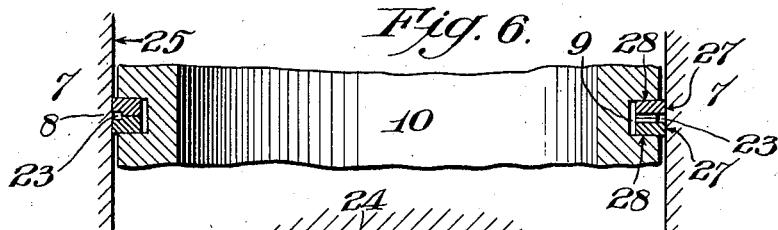
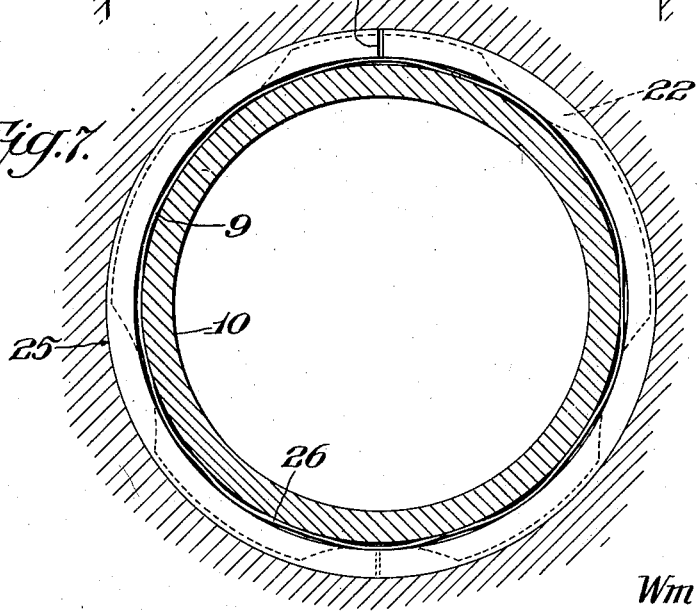
Inventor
Wm. Wuerfel
By Leonard L. Kalish
Attorney Patented Nov. 19, 1935

2,021,572

UNITED STATES PATENT OFFICE 2,021,572

METHOD OF MAKING PISTON RINGS

William Wuerfel, Philadelphia, Pa., assignor to Wilkening Manufacturing Company, Philadelphia, Pa., a corporation of Delaware Original application February 3, 1930, Serial No. 425,638. Divided and this application December 26, 1933, Serial No. 703,969

19 Claims. (Cl. 29—156.62)

My invention relates to a new and useful method of making piston rings, particularly piston rings of the so-called "sectional" type, wherein a plurality (generally two) split annular ring elements are disposed in cooperative relationship to each other within the same ring-receiving groove of a piston; although it is to be understood that the method of the present invention is not limited to the so-called "sectional" type piston rings, but is applicable also to the making of piston rings not of the "sectional" type. My invention relates more paticularly to a method of making piston rings of the "sectional" type as well as other types of "one-piece" piston rings, whereby the same may be produced with the greatest facility and economy of operation and cost, and whereby a certain uniformity and accuracy in production may be obtained.

One of the objects of my invention is to produce a "sectional" piston ring having shallow recesses in the juxtaposed faces of the two annular ring elements, in which any slight variations in the position of the cutting tool will not affect the aggregate overall width of the two juxtaposed recesses in the final product.

Another object of my present invention is to form any desired shallow recess or channel in one side of any split annular piston ring or piston ring member with the greatest facility and economy of operation, and cost, and with enhancement of the uniformity and accuracy of production.

With the above and other objects in view which will appear more fully from the following detailed description, my invention consists in mounting two annular and continuous or unbroken ring elements in alignment and in contact with each other along plane parallel and preformed faces thereof, and successively cutting a series of shallow recesses in the juxtaposed and contacting faces of said ring elements by passing a rotating toothed cutter between the two ring members so that half of the cutter is in one ring member, and the other half of the cutter is in the other ring member and thereafter splitting the ring members at a point to permit the radial expansion thereof.

The invention further consists in a novel method of making the rings, whereby the radial slots and annular groove may be inserted or produced in one continuous operation, with the greatest accuracy and facility and whereby said operation may be carried out on a series of rings at one time.

The method of the present invention is not limited, however, to application to rings in their "un-split" condition or in their unbroken condition, but is equally applicable to the same rings in their "split" condition or broken condition. Thus, obviously the novel method of the present invention can be applied to either a pair or a stack of pairs of "unsplit" or unbroken continuous annular members, and the rings then split after the present method has been completed, or the ring members can be "split" at one point before the application of the present method thereto, and then clamped in their "collapsed" condition or "collapsed" position for the application of the present method thereto.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

This application is a division of my co-pending application Serial No. 425,638, filed February 3, 1930.

Referring to the drawings, in which like reference characters indicate like parts:

Figure 1 represents a front elevation of a horizontal stack of rings, being subjected to the novel method of the instant invention, with the apparatus shown somewhat diagrammatically.

Figure 2 represents a section on line 2—2 of Figure 1, showing the act of forming the annular grooves.

Figure 3 represents a similar section, showing the act of forming the slots.

Figure 4 represents plan views of a pair of juxtaposed annular members comprising a complete piston ring, as they are removed from the stack shown in Figure 1, upon the completion of the entire method.

Figure 5 represents a perspective view of a pair of juxtaposed annular members constituting a complete ring, shown after the annular members have been split and also showing said annular member somewhat separated from each other.

Figure 6 represents an axial section of a fragmentary portion of a piston, having the novel composite or multipiece ring of the instant invention mounted in a ring groove thereof. This sectional view is taken generally on line 6—6 of Figure 4.

Figure 7 represents a section on line 7—7 of Figure 6.

In carrying out the instant invention, a series of plane parallel-walled, annular members are formed of cast iron in any of the usual ways. These plane parallel walled, annular members or blanks 7, are of a width one half that of the entire composite, or multipiece ring, shown particularly in Figures 5 and 6, as a pair of these narrow, annular members constitute or comprise one ring and more or less fill the width of the ring groove 9 of the piston 10. The annular members may be machined (turned and/or ground) in any known manner to produce the two plane parallel faces thereof.

A stack 11 of the plane parallel-walled, annular blanks 7 is formed upon any suitable axial spindle, arbor, mandrel or the like 12, upon which said stack is firmly clamped by any suitable end plates 13, and nuts 14. The stack of clamped, annular blanks 7 is then mounted on any suitable index head or the like, between centers, so that the stack 11, upon the arbor 12, may be rotated or turned accurately any given number of angular degrees, corresponding to the positions of the slots.

A second arbor, spindle or the like 15, having a series of circular saw-like cutters, or milling tools 16 mounted thereon in any convenient or usual manner, as for instance by the spacers 17 and the clamping nuts 18. The circular saws 16 are so spaced from each other that their median planes will correspond with, or register with, the contiguous faces of each pair of blanks 7. The cutting arbor 15, having the series of saws 16 mounted thereon, is then rotatably mounted in operative relation to the stack 11 of blanks 7, so that the axis of the arbor 15 is parallel with the axis of the arbor 12, and means are provided for driving the arbor 15.

The particular means or the particular machine tool employed for carrying out the instant method of making piston rings is not herein shown, because any suitable machine tool may be employed. Thus, for instance, the instant method may be carried out on any conventional milling machine. Thus, the saw arbor 15 may be attached to the main spindle of a milling machine and supported at its free end 19, upon the center 20 carried by the overhanging arm 21 of the milling machine. In using a conventional milling machine for carrying out the instant method, a ring arbor 12 may be mounted upon any conventional index head on the table of the milling machine, directly beneath the saw arbor 15, in a manner indicated generally in Figure 1. If desired however, any special milling machine may be provided for carrying out the instant method, so long as it includes a rotary tool arbor, a rotary indexing work support with its axis parallel to the tool axis and with means for successively varying the distance between the tool axis and the work axis, so as to cause the saws to come nearer to the work and to recede from the work at intervals to the desired extent.

It is to be understood that the rotary character of the work support is relative to the tool arbor just as the variations in distance between the tool axis and the work arbor are also relative. Thus, instead of rotating the work-supporting arbor, this may be maintained stationarily if the axis of the tool arbor is caused to rotate about a circular orbit about the work axis, because this in fact gives the work arbor and piston ring blanks relative rotation with respect to the tool axis.

In carrying out the novel method of the instant invention, the series of saws 16, rotated at any suitable speed, and the stationary stack of rings 11 are brought towards each other so that the saws 16 cut into the stack of rings as indicated in Figure 3, that is, the saws 16 are fed into the stack of rings to a depth sufficient to cut a radial recess of elongated form 22 through each pair of annular members 7; half of the elongated recess being formed in one of the pair of annular members 7 and the other half of the recess being formed in the contiguous face of the other of the pair of annular members 7. The feeding of the saws 16 and the stack of rings 11 towards and away from each other may be effected either by a corresponding lowering and raising of the saw arbor 15, or a corresponding raising and lowering of the work arbor 12, or by any other suitable means.

After the saws 16 have penetrated the stack of rings to a suitable depth to cut an elongated recess clear through the rings, the saws are again withdrawn, but not entirely clear of the rings, but merely are withdrawn to a lesser depth, to wit, a depth corresponding to the depth of the annular groove 23. The stack of rings 11 is then revolved slowly against the rotary saws 16, so that an annular groove of uniform depth and width is cut into the contiguous edge portions of pairs of annular blanks 7. The stack of rings 11 is revolved, until the next slot position is reached, when the rotation of the stack of rings 11 is stopped and the saws are again fed directly through the stack of rings to cut the next series of elongated slots 22. The saws are then again withdrawn to the depth of the annular groove 23, and the stack of rings 11 again rotated slowly against the rotating saws until the next slot position in the rings is reached, when the saws are again fed through the rings while the rings are stationary. This successive series of steps is repeated until the entire series of slots 22 is cut through the stack of rings and the entire annular groove 23 completed around the rings.

The number of slots 22 provided in the rings is optional and may be varied, depending on several factors, among them, the diameter of the rings. In the particular illustration shown in Figures 3 and 4, five slots 22 are provided in the entire ring. Thus, the rings are fed around to stationary positions approximately 72° apart. If desired, the intermittent rotary feeding motion of the rings may be effected by any suitable automatic means.

The result of the foregoing method will be pairs of annular members 7, shown particularly in Figures 4 and 5, having elongated recesses 22 in the contiguous faces thereof, which, when said faces are in abutting relation, form elongated slots through the composite or multipiece ring. The composite or multipiece ring thus formed also contains an annular groove 23 in the outer periphery of the ring. If no outer annular groove is desired, the cutter is entirely withdrawn after each radial cut.

The annular members 7 may then be split as at 24, so as to permit of the outward radial expansion thereof. If desired, the rings may be caused to bear against the cylinder wall 25, in an outward radial direction, by an outward tension set into the ring by any suitable means, or they may be forced outwardly with a uniform radial pressure, by any suitable spring expander 26 inserted in the ring groove behind the piston ring, of any suitable type or construction, as for instance that shown in my Patent No. 1,707,035.

The method of the present invention may be applied to rings that are first "split" (according to any of the "cast-out-of-round" methods, or any of the "round-cast" methods), instead of being "split" subsequently to the application of the present method thereto. Thus, if the method of the present invention is to be applied to previously "split" ring elements or "pre-split" annular members, the ring elements are merely clamped on the arbor 12 in their "collapsed" position in any well-known manner and the method of the present invention may then be carried out just as though the ring were "un-split" at the time.

By means of the novel method herein described, a composite or multipiece piston ring of this character, to wit, including an annular oil groove and a series of radial elongated slots, may be produced with the greatest facility and accuracy and with the minimum labor and cost.

By reason of the fact that the same cutting operation produces the recess in the juxtaposed faces of both ring members of the piston ring, any slight displacement of the cutter towards one or the other of the ring elements during the cutting operation will not alter the aggregate overall width of the two juxtaposed recesses.

The composite or multipiece piston ring 8, formed by the instant novel method, is possessed of certain advantages. Thus, the composite ring 8 is provided with a pair of comparatively narrow, annular bearing surfaces 27, which contact with the cylinder wall 25, and an annular groove 23, intermediate said similar bearing surfaces 27. The effect of the construction is to gather oil into the annular groove 23. The oil collected in the groove 23 then enters the elongated slots or recesses 22 intermediate the two parts 7 of the ring 8, and passes behind the ring into the ring groove 9. If desired, a series of drain holes may be provided in the bottom of the ring groove 9 through the wall of the piston 10, into the interior of the piston and the oil thus gathered in the groove 23 may be drained back into the crank case, in this manner. If desired, however, the composite or multipiece piston ring 8 of the instant novel construction, may be used in piston ring grooves without any oil drain holes.

When the piston ring 8 of this construction is thus used without any oil drain holes, the oil gathered or scraped into the annular groove 23 on the successive reciprocations of the piston 10, is forced into the elongated slots or recesses 22, and also into the space in the ring groove behind the ring, and since the oil cannot escape from said spaces, it has a tendency to exert a hydraulic pressure upon the two halves or members 7 of the ring 8, in opposite directions, tending to force them against the corresponding side walls 28 of the ring grooves 9. This hydraulic pressure of the oil also tends to force the entire ring outwardly in a radial direction. By this means the confined oil has a tendency, by reason of the hydraulic pressure thereof, to force the two halves of the ring apart and thus to firmly fill the ring groove, and also to force the ring outwardly against the cylinder walls. In this manner, the resultant or effective sealing action of the ring is enhanced.

While the method of the present invention is herein illustrated with particular reference to "two-piece" or "sectional" oil control rings or compression rings of the slotted type, it will be understood that the present method is capable of producing other forms of rings for other purposes, including one-piece rings for oil control purposes, and also for compression purposes, and the method of the present invention may be used whenever a partial or interrupted outer peripheral corner channel is to be formed, on ring members or split annular piston rings, or whenever slots are desired in one side of annular ring members or split annular piston rings.

I am aware that my invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I hereby claim as new and desire to secure by Letters Patent, is:

1. The method of making sectional piston rings which consists in clamping together a pair of plane-parallel faced annular members in abutting relation to each other, and forming a series of circumferentially spaced shallow recesses in the juxtaposed and abutting faces of each of said pair of annular members by repeatedly causing a rotating saw-like cutter to penetrate through said pair of annular members in a generally radial direction at circumferentially spaced points with the axis of rotation of said cutter substantially parallel with the axis of said ring members, and with the thickness of the cutter divided generally equally between the two ring members.

2. The method of making sectional piston rings which consists in clamping together a pair of plane-parallel faced annular members in abutting relation to each other, and forming a series of circumferentially spaced shallow recesses in the juxtaposed and abutting faces of each of said pair of annular members by repeatedly causing a rotating saw-like cutter to penetrate through said pair of annular members in a generally radial direction at circumferentially spaced points with the axis of rotation of said cutter substantially parallel with the axis of said ring members, and with the thickness of the cutter divided generally equally between the two ring members, and thereafter splitting the ring members at a suitable point to break the continuity thereof.

3. The method of making piston rings which consists in clamping together a pair of plane-parallel faced annular members in abutting relation to each other, and forming an outer annular recess in the adjacent outer peripheral corners of said annular members, and a series of shallow recesses in the juxtaposed faces thereof, by rotating said pair of clamped annular members against the periphery of a rotary cutter and causing said cutter repeatedly to penetrate through said pair of annular members in a generally radial direction at circumferentially spaced points, with the axis of rotation of said cutter substantially parallel with the axis of said ring members and with the thickness of the cutter divided generally equally between the two ring members.

4. The method of making piston rings which consists in clamping together a pair of plane-parallel faced annular members in abutting relation to each other, and forming an outer annular recess in the adjacent outer peripheral corners of said annular members, and a series of shallow recesses in the juxtaposed faces thereof, by rotating said pair of clamped annular members against the periphery of a rotary cutter and causing said cutter repeatedly to penetrate through said pair of annular members in a generally radial direction at circumferentially spaced points, with the axis of rotation of said cutter substantially parallel with the axis of said ring members and with the thickness of the cutter divided generally equally between the two ring members, and thereafter splitting the ring members at a point in their circumference to break the continuity thereof.

5. The method of making a piston ring which consists in clamping together a pair of plane-parallel faced annular members in abutting relation to each other, forming an annular groove in the outer periphery thereof, divided between said pair of annular members, and forming a series of elongated slots extending radially through said pair of annular members in continuation of said annular groove, by causing said pair of clamped annular members to be fed circularly and generally radially with respect to a rotating saw-like cutter, the axis of which is parallel with the axis of the pair of clamped annular members.

6. The method of making piston rings which consists in clamping a stack of aligned and abutting annular members upon any suitable means, a pair of said annular members having an aggregate width equal to the width of the desired piston ring, providing a series of similar and spaced and rotary cutting tools upon a common axis generally parallel to the axis of said stack of rings, said rotary cutting tool being in alignment with and in operative juxtaposition to the contiguous faces of each pair of said annular members in said stack, feeding said stack of rings against said series of rotary cutting tools, to form corresponding annular grooves in said stack of annular members, and feeding said stack of annular members and said rotary cutting tools radially relative to each other, to form an elongated slot extending through each pair of said annular members in a radial direction.

7. A method of making piston rings which consists in clamping together a pair of plane parallel faced annular rings in abutting relation to each other, and forming an outer annular recess in the adjacent outer peripheral corners of said annular rings, by rotating said pair of annular rings against a rotating saw-like cutter, with the axis of rotation of said cutter substantially parallel with the axis of said ring members and with the thickness of the cutter divided generally equally between the two ring members.

8. The method of making piston rings which consists in clamping together a pair of plane parallel faced annular rings in abutting relation to each other, rotating said pair of clamped annular rings against the periphery of a rotating saw-like cutter so as to form an outer annular recess in the adjacent outer peripheral corners of said annular ring members, said annular recess extending substantially the complete circumference of said annular rings, with the axis of rotation of said cutter substantially parallel with the axis of said ring members.

9. The method of making piston rings which consists in clamping together a pair of plane parallel faced annular rings in abutting relation to each other, and forming a series of circumferentially spaced shallow recesses in the juxtaposed and abutting faces of each of said pair of annular rings by repeatedly causing a rotating saw-like cutter to penetrate said pair of annular rings to predetermined depth and rotating said pair of annular rings with respect to said cutter, the axis of rotation of said cutter being substantially parallel with the axis of said ring members and with the thickness of the cutter divided generally equally between the two ring members.

10. The method of making piston rings which consists in clamping together a pair of plane, parallel-faced annular members in abutting relation to each other upon a rotatable member, disposing a rotating saw-like cutter in juxtaposition to said pair of clamped annular members upon an axis parallel to the axis of said annular members and with the axial width of the saw-like cutter divided generally equally between the pair of clamped annular members, rotating said pair of clamped annular members against the periphery of said rotating saw-like cutter to form an outer annular recess in the adjacent outer peripheral corners of said annular members, and successively and oppositely varying the distance between the axis of said annular members and said saw-like cutter in less than one complete revolution of said pair of clamped annular members in relation to the rotating saw-like cutter.

11. The method of making sectional piston rings which consists in clamping together a number of pairs of plane-parallel faced annular members in abutting relation to each other, and forming a series of circumferentially spaced shallow recesses in the juxtaposed and abutting faces of each annular member of each of said pairs of annular members by repeatedly causing a corresponding number of rotating saw-like cutters to penetrate through said pairs of annular members in a generally radial direction at circumferentially spaced points with the axis of rotation of said cutters substantially parallel with the axis of said ring members, and with the thickness of each cutter divided generally equally between a pair of ring members.

12. The method of making sectional piston rings which consists in clamping together a number of pairs of plane-parallel faced annular members in abutting relation to each other, and forming a series of circumferentially spaced shallow recesses in the juxtaposed and abutting faces of each annular member of each of said pairs of annular members by repeatedly causing a corresponding number of rotating saw-like cutters to penetrate through said pairs of annular members in a generally radial direction at circumferentially spaced points with the axis of rotation of said cutters substantially parallel with the axis of said ring members, and with the thickness of each cutter divided generally equally between a pair of ring members, and thereafter splitting the ring members at a suitable point to break the continuity thereof.

13. The method of making piston rings which consists in clamping together a number of pairs of plane-parallel faced annular members in abutting relation to each other, and forming an outer annular recess in the adjacent outer peripheral corners of pairs of said annular members, and a series of shallow recesses in the juxtaposed faces of pairs of said annular members, by rotating said pairs of clamped annular members against the periphery of a corresponding number of rotary cutters and causing corresponding number of cutters repeatedly to penetrate through said pairs of annular members in a generally radial direction at circumferentially spaced points, with the axis of rotation of said cutters substantially parallel with the axis of said ring members and with the thickness of each cutter divided generally equally between a pair of ring members.

14. The method of making piston rings which consists in clamping together a number of pairs of plane-parallel faced annular members in abutting relation to each other, and forming an outer annular recess in the adjacent outer peripheral corners of said annular members, and a series of shallow recesses in the juxtaposed faces thereof, by rotating said pairs of clamped annular members against the periphery of a corresponding number of rotary cutters and causing said corresponding number of cutters repeatedly to penetrate through said pairs of annular members in a generally radial direction at circumferentially spaced points, with the axis of rotation of said cutters substantially parallel with the axis of said pairs of ring members and with the thickness of each cutter divided generally equally between a pair of ring members, and thereafter splitting the ring members at a point in their circumference to break the continuity thereof.

15. The method of making piston rings which consists in clamping together a number of pairs of plane-parallel faced annular members in abutting relation to each other, forming annular grooves in the outer peripheries thereof, divided between the two members of said pairs of annular members, and forming a series of elongated slots extending radially through said pairs of annular members in continuation of said annular grooves, by causing said pairs of clamped annular members to be fed circularly and generally radially with respect to a corresponding number of rotating saw-like cutters, the axes of which are parallel with the axes of the pairs of clamped annular members.

16. A method of making piston rings which consists in clamping together a number of pairs of plane parallel faced annular rings in abutting relation to each other, and forming an outer annular recess in the adjacent outer peripheral corners of said annular rings, by rotating said pairs of annular rings against a corresponding number of rotating saw-like cutters, with the axis of rotation of said cutters substantially parallel with the axis of said ring members, and with the thickness of each cutter divided generally equally between a pair of ring members.

17. The method of making piston rings which consists in clamping together a number of pairs of plane parallel faced annular rings in abutting relation to each other, rotating said pairs of clamped annular rings against the periphery of a corresponding number of rotating saw-like cutters so as to form an outer annular recess in the adjacent outer peripheral corners of said annular ring members, said annular recess extending substantially the complete circumference of said annular rings, with the axis of rotation of each cutter substantially parallel with the axis of said ring members.

18. The method of making piston rings which consists in clamping together a number of pairs of plane parallel faced annular rings in abutting relation to each other, and forming a series of circumferentially spaced shallow recesses in the juxtaposed and abutting faces of each annular member of each of said pairs of annular rings by repeatedly causing a corresponding number of rotating saw-like cutters to penetrate said pairs of annular rings to predetermined depth and rotating said pairs of annular rings with respect to said cutters, the axis of rotation of each cutter being substantially parallel with the axis of said ring members, and with the thickness of each cutter divided generally equally between a pair of ring members.

19. The method of making piston rings which consists in clamping together a number of pairs of plane, parallel-faced annular members in abutting relation to each other upon a rotatable member, disposing a corresponding number of rotating saw-like cutters in juxtaposition to said pairs of clamped annular members upon an axis parallel to the axis of said annular members and with the axial width of one of the saw-like cutters divided generally equally between the two annular members of each pair of said annular members, rotating said pairs of clamped annular members against the peripheries of said rotating saw-like cutters to form outer annular recesses in the adjacent outer peripheral corners of said pairs of annular members, and successively and oppositely varying the distance between the axis of said annular members and said saw-like cutters in less than one complete revolution of said pairs of clamped annular members in relation to the rotating saw-like cutters.

WILLIAM WUERFEL.